United States Patent
Smith et al.

(10) Patent No.: US 7,239,355 B2
(45) Date of Patent: Jul. 3, 2007

(54) METHOD OF FRAME SYNCHRONIZATION WHEN SCALING VIDEO AND VIDEO SCALING APPARATUS THEREOF

(75) Inventors: Sterling Smith, Hsin-Chu Hsien (TW); Jiunn-Kuang Chen, Tao-Yuan (TW); Hsu-Lin FanChiang, Hsin-Chu (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 26 days.

(21) Appl. No.: 10/908,473

(22) Filed: May 13, 2005

(65) Prior Publication Data

US 2005/0254509 A1    Nov. 17, 2005

Related U.S. Application Data

(60) Provisional application No. 60/571,514, filed on May 17, 2004.

(51) Int. Cl.
*H04N 5/04* (2006.01)
(52) U.S. Cl. ........................................ 348/521; 348/349
(58) Field of Classification Search ................ None
See application file for complete search history.

(56) References Cited

U.S. PATENT DOCUMENTS

| | | | |
|---|---|---|---|
| 3,758,711 A * | 9/1973 | Crosno | 386/89 |
| 4,218,705 A * | 8/1980 | Inaba et al. | 348/512 |
| 4,675,722 A * | 6/1987 | Hackett | 348/530 |
| 4,703,355 A * | 10/1987 | Cooper | 348/512 |
| 4,872,054 A * | 10/1989 | Gray et al. | 348/441 |
| 4,974,082 A * | 11/1990 | Heitmann | 348/537 |
| 5,012,340 A * | 4/1991 | Kirschenstein | 348/524 |
| 5,068,905 A * | 11/1991 | Hackett et al. | 382/299 |
| 5,227,882 A | 7/1993 | Kato | |
| 5,410,357 A * | 4/1995 | Rieger et al. | 348/458 |
| 5,446,496 A * | 8/1995 | Foster et al. | 348/441 |
| 5,739,867 A | 4/1998 | Eglit | |
| 5,835,155 A * | 11/1998 | Jennes et al. | 348/536 |
| 5,838,381 A * | 11/1998 | Kasahara et al. | 348/458 |
| 5,874,937 A * | 2/1999 | Kesatoshi | 345/428 |
| 5,933,196 A | 8/1999 | Hatano et al. | |
| 5,953,074 A * | 9/1999 | Reddy | 348/558 |
| 6,002,446 A * | 12/1999 | Eglit | 348/581 |
| 6,037,925 A * | 3/2000 | Kim | 345/99 |
| 6,067,071 A * | 5/2000 | Kotha et al. | 345/698 |
| 6,078,361 A | 6/2000 | Reddy | |
| 6,108,485 A * | 8/2000 | Kim | 386/96 |

(Continued)

*Primary Examiner*—Mark Zimmerman
*Assistant Examiner*—David Chu
(74) *Attorney, Agent, or Firm*—Winston Hsu

(57) ABSTRACT

A video scaling apparatus includes a receiver for receiving incoming video signals having transmitted therein a plurality of incoming frames, each incoming frame having a first plurality of synchronization signals for indicating lines in the incoming frame; a scaler with a line extender for generating outgoing video signals having transmitted therein a plurality of outgoing frames, each outgoing frame having a second plurality of synchronization signals for indicating lines in the outgoing frame, and for generating an outgoing frame for each incoming frame. The line extender ensures durations of all lines in the outgoing video signals are of substantially equal length. By ensuring that all lines in the outgoing frame are of substantially the same length, the reliability of a display device receiving the outgoing video signals is increased. Additionally, the frequency requirements of an outgoing clock for the video signals can be less stringent.

21 Claims, 5 Drawing Sheets

U.S. PATENT DOCUMENTS

| | | | |
|---|---|---|---|
| 6,177,922 B1* | 1/2001 | Schiefer et al. | 345/698 |
| 6,219,105 B1* | 4/2001 | Kashiro et al. | 348/521 |
| 6,577,322 B1* | 6/2003 | Fukuda | 345/698 |
| 6,636,269 B1* | 10/2003 | Baldwin | 348/500 |
| 7,047,305 B1* | 5/2006 | Brooks et al. | 709/231 |
| 7,119,849 B2* | 10/2006 | Yui et al. | 348/564 |
| 2002/0036713 A1* | 3/2002 | Zhang et al. | 348/607 |
| 2002/0041335 A1* | 4/2002 | Taraci et al. | 348/511 |
| 2005/0237429 A1* | 10/2005 | Grundmeyer et al. | 348/510 |
| 2006/0077288 A1* | 4/2006 | Wu | 348/441 |
| 2006/0114275 A1* | 6/2006 | Kim et al. | 345/698 |

* cited by examiner

METHOD OF FRAME SYNCHRONIZATION WHEN SCALING VIDEO AND VIDEO SCALING APPARATUS THEREOF

CROSS REFERENCE TO RELATED APPLICATIONS

This application claims the benefit of U.S. Provisional Application No. 60/571,514, filed May 17, 2004, entitled "Apparatus and Method for Adjusting the Size of an Image" and included herein by reference.

BACKGROUND OF INVENTION

1. Field of the Invention

The invention relates to scaling video, and more particularly, to a method and apparatus for performing frame synchronization between incoming video signals and outgoing video signals when scaling video.

2. Description of the Prior Art

Display units are often used to receive and display image frames contained in a video signal received on a serial communication channel. As commonly referenced, display units include both analog display units (typically based on cathode ray tube technology) and digital display units (typically based on flat panels). As is well known, the image frames are represented by pixel data elements encoded within a display data portion of the video signal.

Video signals generally also contain synchronization signals that indicate the transitions between the line boundaries and frame boundaries in the accompanying display data. Examples of such signals include the horizontal synchronization HSYNC signal (indicating a transition to a next line) and the vertical synchronization VSYNC signal (indicating a transition from a current frame to a next frame), as is well known in the relevant arts.

When scaling image frames from a first resolution to a second resolution, conventionally generate outgoing frames at the second resolution at the same rate as the incoming frames are received. That is, in a scaling apparatus, each incoming frame results in an outgoing frame with a precise timing relationship. The method of locking the incoming frame rate to the outgoing frame rate is commonly referred to as frame synchronization. When frame lock is achieved, vertical synchronization VSYNC signals (i.e., frames) in the outgoing video signals are separated by the same time period as the vertical synchronization VSYNC signals in the incoming video signals.

FIG. 1 shows a block diagram of a typical video scaling apparatus 100. The video scaling apparatus 100 includes a receiver 102, a scaler 104, a transmitter 106, a clock generator 110, and an oscillator 114. The receiver 102 receives an incoming video signal Video_in and extracts incoming pixel data Pixel_in, a vertical sync signal VS_in, and a horizontal sync signal HS_in. The clock generator 110 generates an output clock Clk_out according to the output of the oscillator 114 such that during an outgoing frame time as determined by the incoming frame time, the correct number of lines and pixels in each line can be transmitted in the outgoing video signals. The scaler 104 generates outgoing video signals comprising outgoing pixel data Pixel_out, an outgoing vertical sync signal VS_out, and an outgoing horizontal sync signal HS_out according to the incoming information Pixel_in, VS_in, HS_in, the output clock Clk_out, and the desired second resolution. The transmitter 106 converts the generated video signals Pixel_out, VS_out, HS_out into an outgoing video signal Video_out for transmission to a display unit (not shown).

FIG. 2 shows a timing diagram of synchronization signals VS_out, HS_out corresponding to frames and lines in the outgoing video signals (Pixel_out, VS_out, HS_out) generated by the scaler 104. Within each frame, rising edges in the horizontal synchronization signal HS_out are used to determine the starting position of specific pixel data elements that represent lines of the image frame. Among the many pixel data elements contained in the pixel data Pixel_out, some pixel data elements correspond to the displayed image frame and others correspond to the non-display period. In many known display units, signals are generated based on the synchronization signals to indicate whether an active horizontal line and active pixel data element are presently being received. The active pixels in the active lines represent image to be displayed while non-active pixel data can be used to transmit other data such as control information. The Line_out variable shown in FIG. 2 indicates the outgoing line number for each horizontal line in the outgoing frame. For example, in a 1024×768 XGA signal, there are typically 768 active lines having 1024 active pixels in display signal. Additionally, there are approximately 38 non-active lines in each frame present when the vertical sync signal VS_out is not asserted. Therefore, the total number of lines n in each frame for this example would be n=806.

However, a problem exists when attempting to lock the incoming frame rate to the outgoing frame rate. In particular, unless the outgoing clock signal Clk_out is generated exactly at the correct frequency, there will always some leftover space at the end of the frame which will result in a partial line, indicated as the $(n+1)^{th}$ line 202 in FIG. 2. The reason for the partial line 202 is that it is not normally possible to have the exact desired frequency of the output Clk_out so the next incoming frame will start immediately after a last line in the current outgoing frame is fully completed. Additionally, electro magnetic interference (EMI) reduction techniques such as spread-spectrum clock signals or other factors such as operating temperature or device manufacturing impurities may cause the outgoing clock Clk_out to deviate from the exact desired frequency.

SUMMARY OF INVENTION

One objective of the claimed invention is therefore to provide a method of frame synchronization to avoid partial lines in an outgoing video frame, to thereby solve the above-mentioned problems.

A method of frame synchronization when scaling video is disclosed. The method comprises receiving incoming video signals having transmitted therein a plurality of incoming frames, each incoming frame having a first plurality of synchronization signals for indicating lines in the incoming frame; generating outgoing video signals having transmitted therein a plurality of outgoing frames, each outgoing frame having a second plurality of synchronization signals for indicating lines in the outgoing frame; generating an outgoing frame for each incoming frame; and ensuring durations of all lines in the outgoing video signals are of substantially equal length.

A video scaling apparatus comprises a receiver for receiving incoming video signals having transmitted therein a plurality of incoming frames, each incoming frame having a first plurality of synchronization signals for indicating lines in the incoming frame; a scaler with a line extender for generating outgoing video signals having transmitted therein a plurality of outgoing frames, each outgoing frame having a second plurality of synchronization signals for indicating lines in the outgoing frame, and for generating an outgoing frame for each incoming frame; and a transmitter coupled to the scaler for converting the outgoing frames into an outgoing video signal. The line extender ensures durations of all lines in the outgoing video signals are of substantially equal length.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
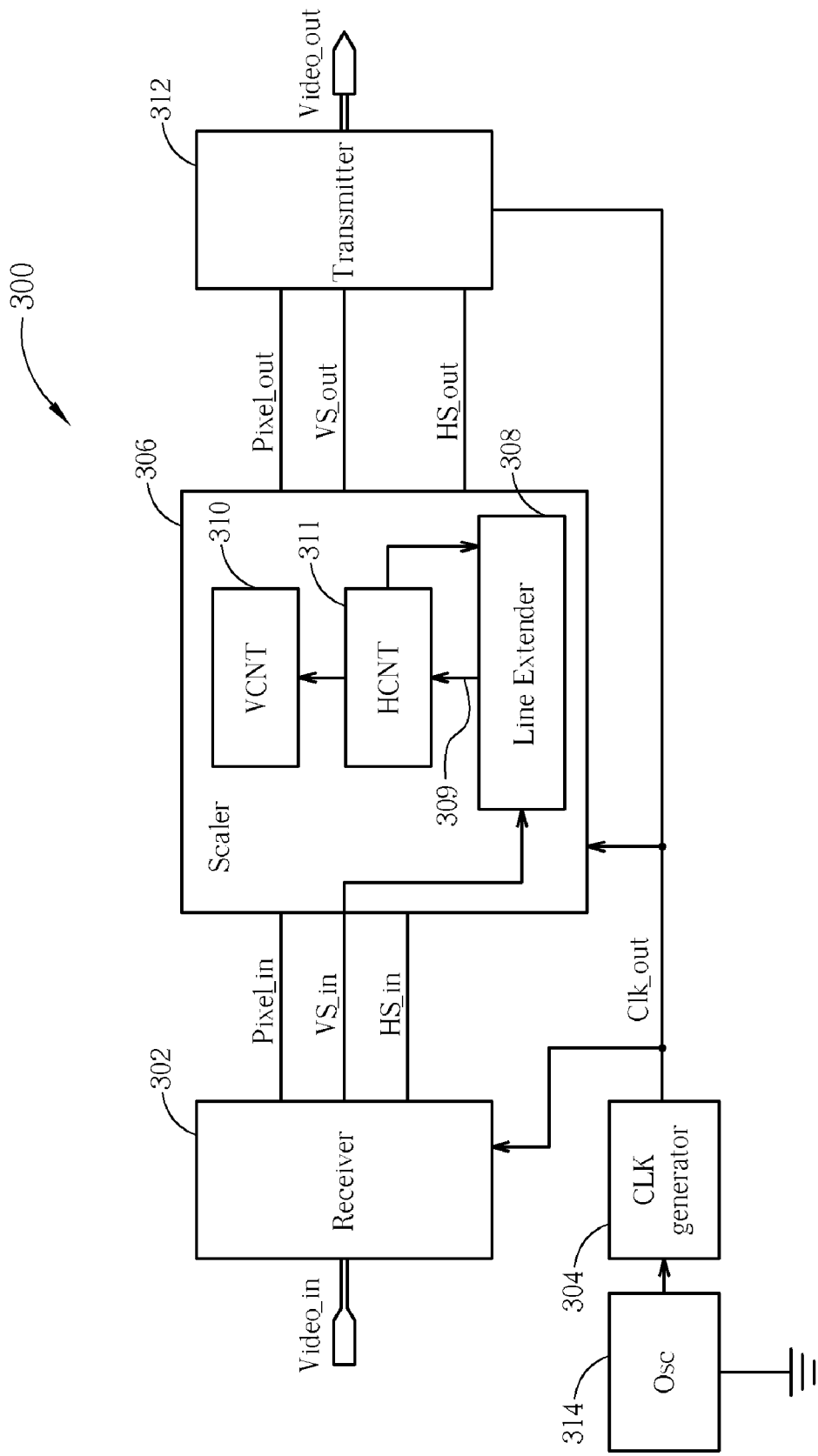
FIG. 3 shows a video scaling apparatus according to a first exemplary embodiment of the present invention.

FIG. 3 shows a video scaling apparatus 300 according to a first exemplary embodiment of the present invention. The video scaling apparatus 300 is utilized for scaling frames of an incoming video signal Video_in being at a first resolution to frames of an outgoing video signal Video_out being at a different resolution. For example, the incoming video and outgoing signals could be such formats as Digital Visual Interface (DVI) or Digital Flat Panel (DFP) compliant signals. In a first exemplary application, the incoming video signal Video_in could be at a lower resolution such as 640*480 or 800*600 and the outgoing video signal Video_out could be at a higher resolution such as 1024*768 or 1280*1024. Therefore, a number of incoming lines in the incoming frame is different than a number of outgoing lines in the outgoing frame because the incoming resolution of the incoming frame is different than the outgoing resolution of the outgoing frame. As will be become apparent to a person of ordinary skill after reading the following disclosure, the present invention is not limited to a particular set of video resolutions and can be applied to synchronizing frames between video signals having any combination of incoming resolutions and outgoing resolutions.

In the exemplary embodiment of FIG. 3, the video scaling apparatus 300 includes a receiver 302, a clock generator 304, a scaler 306, an oscillator 314, and a transmitter 312. The scaler 306 includes a vertical counter (VCNT) 310, a horizontal counter (HCNT) 311, and a line extender 308. The receiver 302 receives an incoming video signal Video_in and extracts incoming pixel data Pixel_in, an incoming vertical sync signal VS_in, and an incoming horizontal sync signal HS_in. The extracted video signals have transmitted therein a plurality of incoming frames as marked by the incoming vertical sync signal VS_in, and each incoming frame has a first plurality of rising edges on the horizontal sync signal HS_in for indicating lines in the incoming frame. The clock generator 304 receives a clock signal from the oscillator 314 and generates an output clock signal Clk_out such that during an outgoing frame time as determined by the incoming frame time, at least the correct number of lines and pixels in each line can be transmitted. Each outgoing frame has a plurality of rising edges on the horizontal sync signal HS_out for indicating lines in the outgoing frame.

Figure 1:
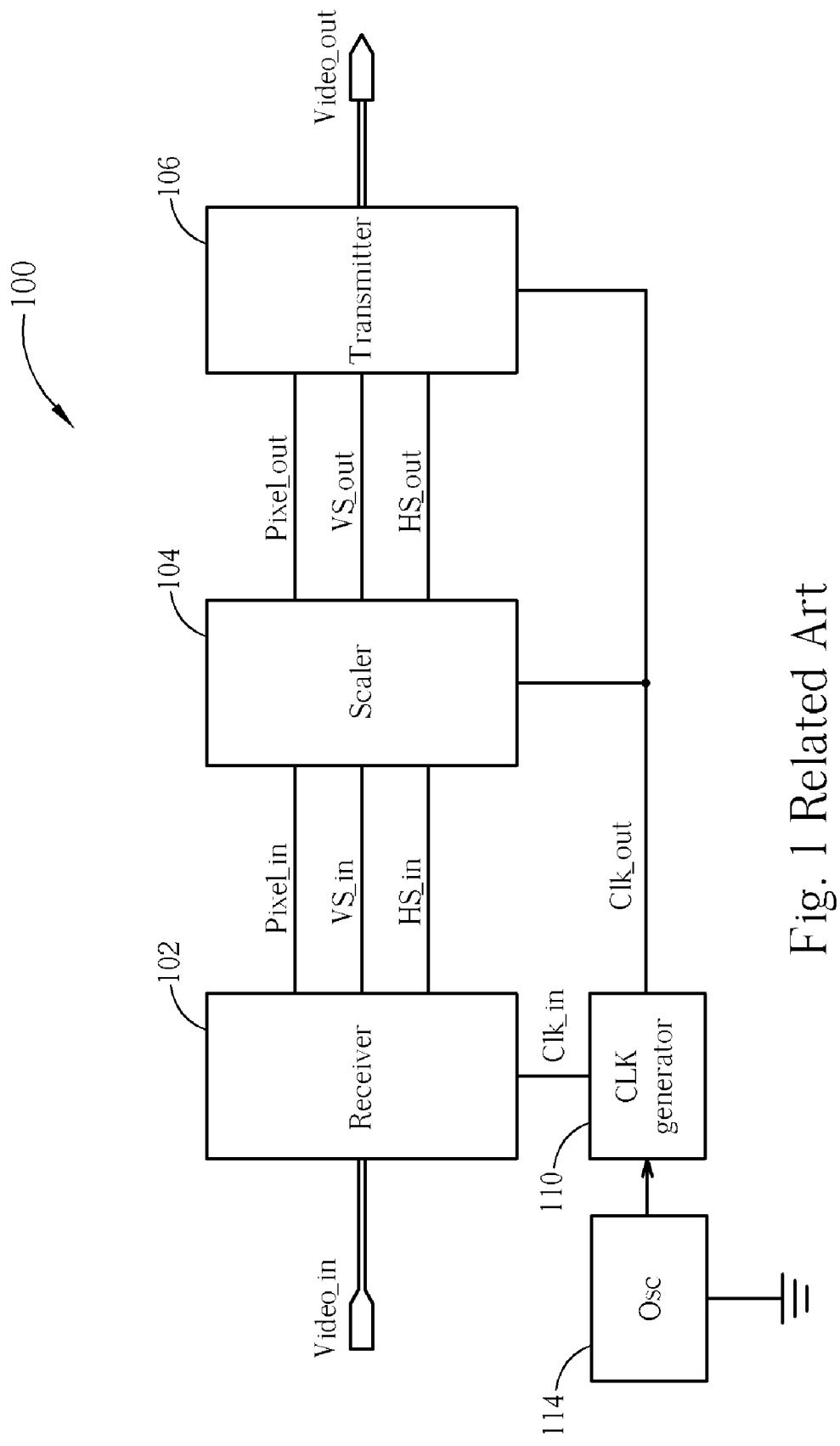
FIG. 1 shows a block diagram of a typical video scaling apparatus.
Figure 2:
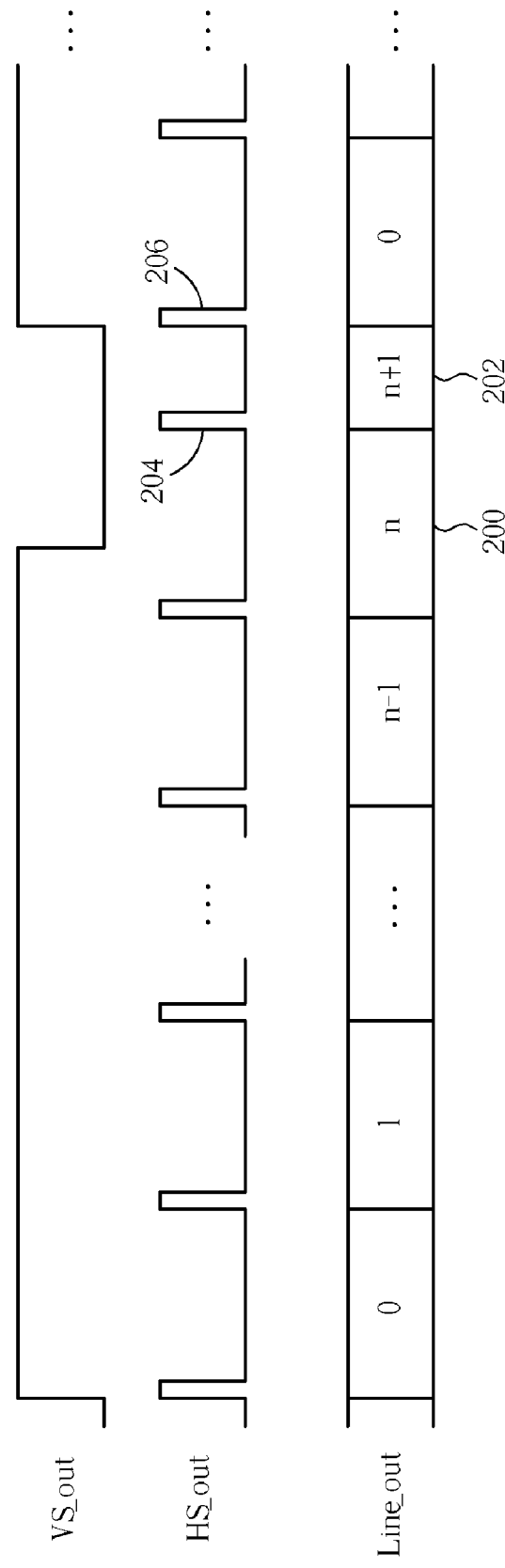
FIG. 2 shows a timing diagram of vertical and horizontal synchronization signals corresponding to frames and lines respectively in the outgoing video signals generated by the scaler of FIG. 1.

The scaler 306 receives the horizontal sync signal HS_in, the vertical sync signal VS_in and incoming pixel data Pixel_in and properly generates a corresponding outgoing horizontal sync signal HS_out, the outgoing vertical sync signal VS_out and outgoing pixel data Pixel_out. According to this embodiment of the present invention, the line extender 308 in the scaler 306 ensures that all the lines indicated by the outgoing horizontal sync signal HS_out are of substantially equal length (i.e., have the same time period). Therefore, in the case that a last line of the horizontal sync signal HS_in is a partial line (similar to the partial line 202 shown in FIG. 2), the line extender 308 extends the corresponding last line of the outgoing horizontal sync signal HS_out by the appropriate amount to ensure that all lines in the outgoing frame are of substantially the same duration. Therefore, the last line of the frame will be changed from a partial line to the complete length by the line extender 308. The line extender 308 may receive VS_in, for example, and force HCNT 311 to count for a complete line through control signal 309 in response to the rising edge of VS_in. Thus, VCNT 310 may be n or n+1, where n refers to the proper number of horizontal lines according to the outgoing resolution. Please note that utilizing VS_in in the embodiment shown in FIG. 3 is meant as an example; that is, the present invention may include a line extender 308 operating according to any "frame-based signal". Additionally, the VCNT 310 and HCNT 311 values are associated with the respective display resolutions. In this way, the next frame indicated by the outgoing vertical sync signal VS_out will start after the end of the last line, which will have a full length. The transmitter 312 coupled to the scaler 306 converts the generated outgoing video signals Pixel_out, VS_out, HS_out into an outgoing video signal Video_out having the proper electrical properties for transmission to a display unit (not shown).

According to this embodiment of the present invention, each outgoing frame in the outgoing video signals Pixel_out, VS_out, HS_out contains lines of substantially the same length. By ensuring that all lines in the outgoing frame are of substantially the same length, the present invention prevents a display device that receives the generated video signal Video_out from experiencing the malfunction problems associated with incorrect duration lines occurring at the end of video frames. Furthermore, as will be explained later in more detail, the clock generator 304 is not required to generate an outgoing clock Clk_out having exactly the correct frequency. An SSC (spread spectrum clock) can be implemented as the clock generator 304 to reduce the EMI, thus the hardware complexity of the clock generator 304 can be reduced and the life time of the whole chip can be extended.

Figure 4:
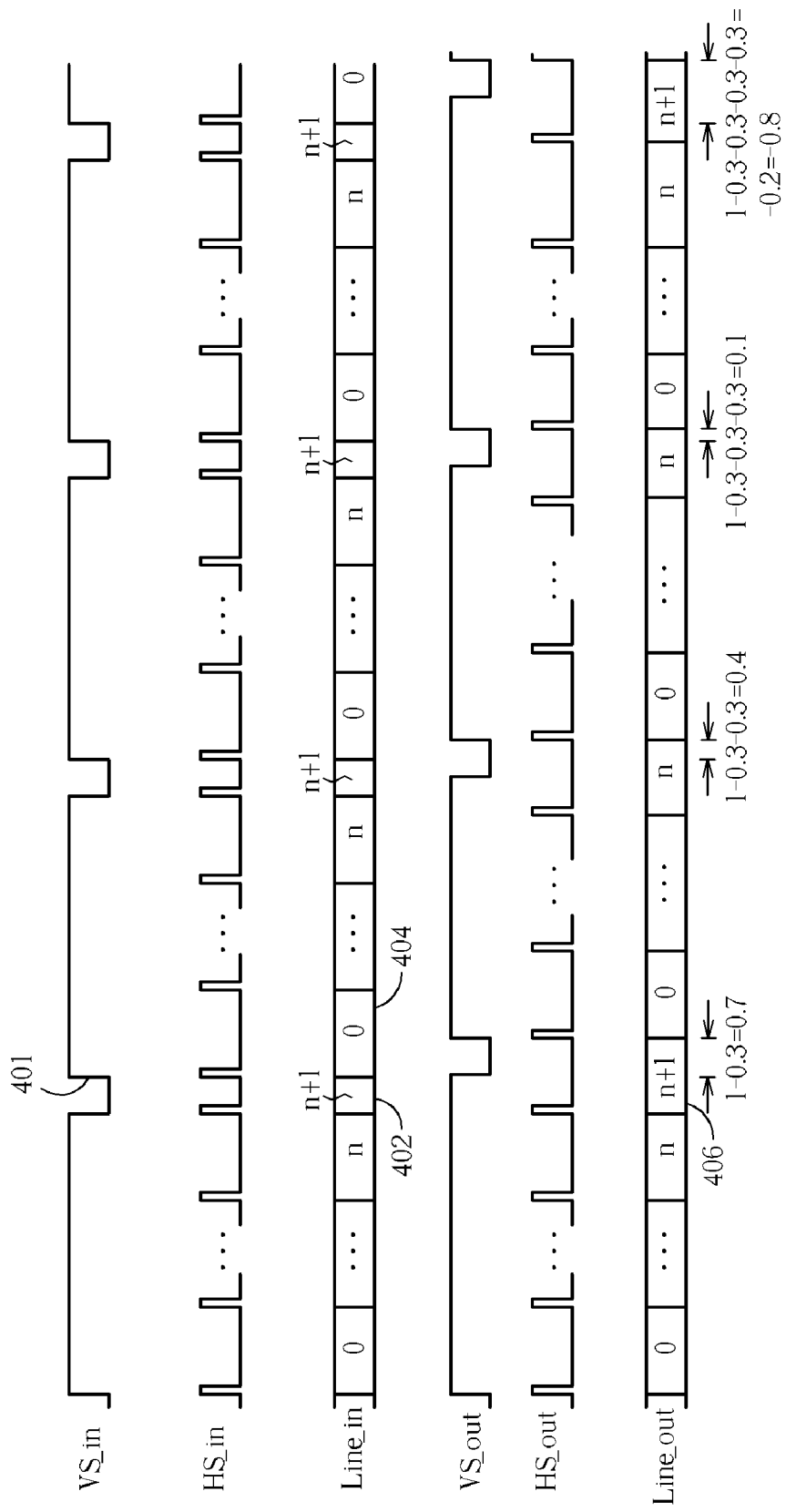
FIG. 4 shows a timing diagram of the synchronization signals generated according to this embodiment of the present invention.

FIG. 4 shows a timing diagram of the synchronization signals generated according to this embodiment of the present invention. As shown in FIG. 4, the incoming vertical sync signal VS_in indicates the beginning and end of active lines in the frames, and the horizontal sync signal HS_in indicates the lines. The line number in the incoming frame is indicated by an incoming line count Line_in. The line extender 308 monitors the time duration between adjacent rising edges in the horizontal sync signal HS_in. As shown in FIG. 4, due to the outgoing clock Clk_out not being exactly the correct frequency, there is still some time at the end of a current frame so an extra partial line 402 is encountered. This partial line 402 is shorter in duration than the other lines in the frame. According to the present invention, the line extender 308 adds an extra line 406 to the outgoing frame if the outgoing frame in the outgoing video signals has ended before a next incoming frame in the incoming video signals has started. In this example, the next frame does not start until rising edge 401. The line extender 308 ensures the extra line 406 has the same length as the other lines in the outgoing frame.

In the general case, when a partial line (such as line 402 in FIG. 4) is encountered, the line extender 308 delays the second rising edge by a remaining amount so that the line becomes the complete length. That is, the scaler 306 asserts a next outgoing horizontal synchronization signal HS_out such that the extra line 406 of the outgoing frame is substantially the same duration as all other lines in the outgoing video signals.

However, extending a line of a current frame may then cause the last line of a next frame in the outgoing video signals to extend past a time after a next vertical synchronization signal VS_in has occurred. For example, as shown in FIG. 4, extending the last line 402 of the first frame delays the first line 404 of a second frame starting. Additionally, there will be a delay required for the following pixel data Pixel_out and the outgoing vertical sync signal VS_out for the outgoing video signals. To provide the required delay, the line extender 308 delays the pixel data Pixel_in while the extra line 406 of the current frame is being extended. Then, as soon as the extra line 406 is finished, the first line of the next frame is started. In this way, the scaler 306 starts a next outgoing frame after a last line 406 of a current outgoing frame is completed if a next incoming frame starts in the middle of the last line 406 of the current outgoing frame. The line extender 308 determines that the last line 406 of the current outgoing frame is completed after generating an outgoing synchronization signal such as a rising edge on the horizontal sync signal HS_out for the last line of the outgoing frame such that the last line of the outgoing frame is substantially the same duration as all other lines in the outgoing video signals.

As mentioned previously, it is normally not possible, or may require too great a cost, to ensure that the output clock signal Clk_out is exactly the correct frequency. It is a benefit of the present invention that the clock generator 304 generates the output clock signal Clk_out such that at least the correct number of lines and pixels in each line can be transmitted in the outgoing frame time. According to the present invention, the clock generator 304 simply has to generate the clock signal Clk_out such that during the duration of the outgoing frame, there is time for the correct number of lines in the outgoing frame as dictated by the outgoing resolution in addition to some time for a fraction of an extra line. After selectively extending a last line (such as line 406 in FIG. 4) to become the same length as the other lines in the outgoing frame, the current outgoing frame will not be finished before the next incoming frame starts. Depending on how fast the frequency of the output clock signal Clk_out is running, a next outgoing frame may or may not be finished before a next incoming frame starts. However, because the outgoing clock signal Clk_out is running slightly too fast, eventually a current outgoing frame will be finished before the next incoming frame starts and the line extender 308 can add an extra full length line to the outgoing frame (or extend a partial line to become a full length line at the end of the outgoing frame). The process then repeats. For various CRT monitors, which are sensitive to the synchronization frequency, the present invention further improves the compatibility and stability of the video scaling apparatus therein since no short lines occur.

The following shows a numerical example of determining whether or not an extra line (n+1) will be added to an outgoing frame assuming the outgoing clock Clk_out is such that an outgoing frame having n lines is 0.3 of a line too short. That is, an in frame time (IFT)=n complete lines+a 0.3 short line.

| Frame# | Frame start difference | Total number of lines |
|--------|------------------------|------------------------|
| 0 | 0.0 | |
| 1st | 1 − 0.3 = 0.7 | n + 1 |
| 2nd | 1 − 0.3 − 0.3 = 0.4 | n |
| 3rd | 1 − 0.3 − 0.3 − 0.3 = 0.1 | n |
| 4th | 1 − 0.3 − 0.3 − 0.3 − 0.3 = −0.2 = 0.8 | n + 1 |
| 5th | 0.8 − 0.3 = 0.5 | n |

In general, the first outgoing frame will have a vertical line count vcnt=n+1 because there will be extra time (delta) before the next incoming frame starts. Afterwards, for the $m^{th}$ frame, if 1−(delta*m)>0, vcnt=n; otherwise if 1−delta*m<0, vcnt=n+1. The above numerical example is also illustrated in the timing diagram of FIG. 4.

Further referring back to FIG. 3, the line extender 309 ensures the horizontal counter 311 counts to a first predetermined value for each line and the vertical counter 310 counts to a second predetermined value or the second predetermined value plus one, i.e. n or n+1 in the above explanation, for each outgoing frame. Preferably, the vertical counter 310 is reset to 0 in response to a frame-based signal, such as the input vertical synchronization signal VS_in, and the control signal from the horizontal counter 311.

Figure 5:
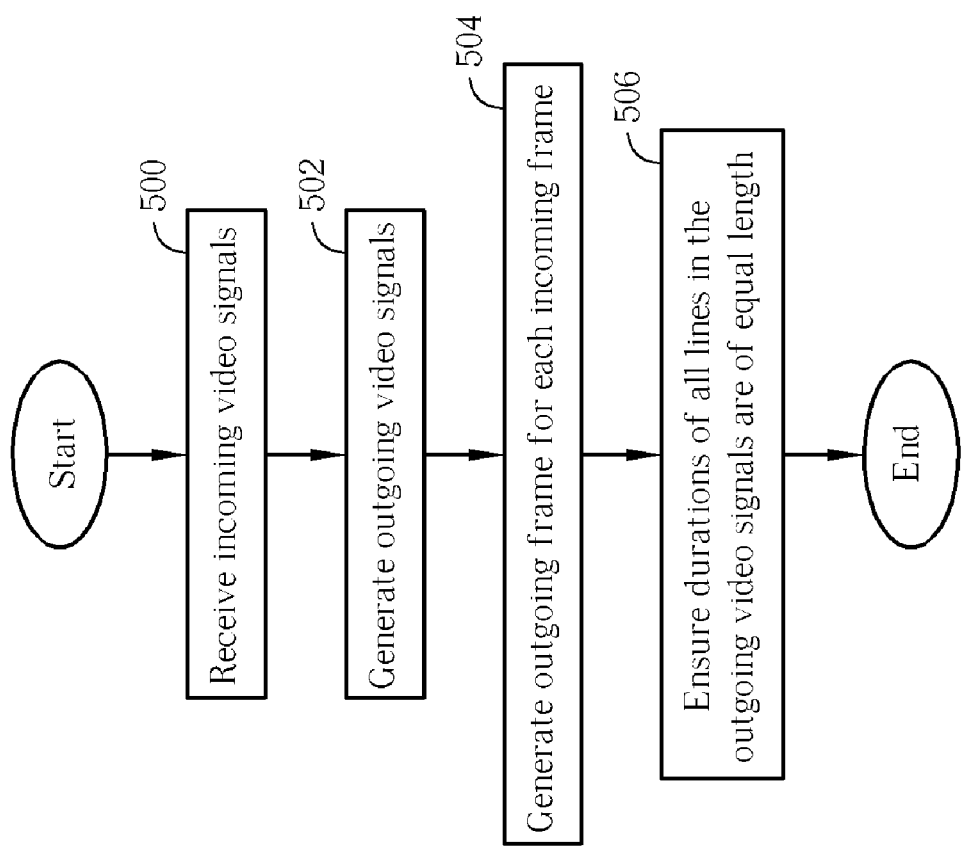
FIG. 5 shows a flowchart describing operations of frame synchronization when scaling video according to a second exemplary embodiment of the present invention.

FIG. 5 shows a flowchart describing operations of frame synchronization when scaling video according to a second exemplary embodiment of the present invention. Provided that substantially the same result is achieved, the steps of the flowchart shown in FIG. 5 need not be in the exact order shown and need not be contiguous; that is, other steps can be intermediate. In this embodiment of the present invention, frame synchronization when scaling video includes the following steps:

Step 500: Receive incoming video signals having transmitted therein a plurality of incoming frames, each incoming frame having a first plurality of synchronization signals for indicating lines in the incoming frame.

Step 502: Generate outgoing video signals having transmitted therein a plurality of outgoing frames, each outgoing frame having a second plurality of synchronization signals for indicating lines in the outgoing frame.

Step 504: Generate an outgoing frame for each incoming frame.

Step 506: Ensure that durations of all lines in the outgoing video signals are of substantially equal length.

In this way, each outgoing frame in the outgoing video signals Pixel_out, VS_out, HS_out contains lines of substantially the same length. By ensuring that all lines in the outgoing frame are of substantially the same length, the present invention prevents a display device receiving the generated video signal Video_out from experiencing the malfunction problems associated with incorrect length lines occurring at the end of video frames. The operational reliability of the display device receiving the outgoing video signals is thereby increased by the present invention. It is a further advantage of the present invention that the frequency of the outgoing clock Clk_out generated by the clock generator 304 does not need to be exactly the desired frequency. That is, the frequency requirements of the outgoing clock Clk_out for the outgoing video signals are less stringent. The clock generator 304 according to the present invention ensures the outgoing clock signal Clk_out has a frequency such that within a frame duration of the incoming frame, the outgoing frame has at least time for a correct number of lines and each line has a correct number of pixels as dictated by the outgoing resolution. The costs and design complexity associated with the video scaling apparatus 300 are thereby reduced according to the present invention. Additionally, electro magnetic interference (EMI) reduction techniques such as spread-spectrum clock signals can be used with the present invention, and other factors such as operating temperature or device manufacturing impurities that may cause the outgoing clock Clk_out to deviate from the exact desired frequency no longer cause partial lines in the outgoing video signals.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of frame synchronization when scaling video, the method comprising:
   receiving incoming video signals having transmitted therein a plurality of incoming frames, each incoming frame having a first plurality of synchronization signals for indicating lines in the incoming frame;
   generating outgoing video signals having transmitted therein a plurality of outgoing frames, each outgoing frame having a second plurality of synchronization signals for indicating lines in the outgoing frame;
   generating an outgoing frame for each incoming frame;
   ensuring durations of all lines in the outgoing video signals are of substantially equal length; and
   adding an extra line to the outgoing frame if the outgoing frame in the outgoing video signals has ended before a next incoming frame in the incoming video signals has started.

2. The method of claim 1, wherein a number of incoming lines in the incoming frame is different than a number of outgoing lines in the outgoing frame.

3. The method of claim 1, wherein an incoming resolution of the incoming frame is different than an outgoing resolution of the outgoing frame.

4. The method of claim 3, further comprising providing an outgoing clock signal having a frequency such that within a frame duration of the incoming frame, the outgoing frame has at least time for a correct number of lines and each line has a correct number of pixels as dictated by the outgoing resolution.

5. The method of claim 4, further comprising generating the clock signal such that during the duration of the outgoing frame, there is time for the correct number of lines in the outgoing frame as dictated by the outgoing resolution in addition to time for a fraction of an extra line.

6. The method of claim 1, further comprising generating a next outgoing synchronization signal for the extra line such that the extra line of the outgoing frame is substantially the same duration as all other lines in the outgoing video signals.

7. The method of claim 1, further comprising starting a next outgoing frame after a last line of a current outgoing frame is completed if a next incoming frame starts in the middle of the last line of the current outgoing frame;
   wherein the last line of the current outgoing frame is determined to be completed after generating an outgoing synchronization signal for the last line of the outgoing frame such that the last line of the outgoing frame is substantially the same duration as all other lines in the outgoing video signals.

8. The method of claim 7, further comprising delaying pixel data of the incoming video signals while completing the last line of the outgoing frame.

9. The method of claim 1, wherein the incoming video signals are Digital Visual Interface (DVI) or Digital Flat Panel (DFP) compliant signals.

10. A video scaling apparatus comprising:
    a receiver for receiving incoming video signals having transmitted therein a plurality of incoming frames, each incoming frame having a first plurality of synchronization signals for indicating lines in the incoming frame;
    a scaler coupled to said receiver and having a line extender therein, for generating outgoing video signals having transmitted therein a plurality of outgoing frames, each outgoing frame having a second plurality of synchronization signals for indicating lines in the outgoing frame, and for generating an outgoing frame for each incoming frame; and
    a transmitter coupled to said scaler for converting said outgoing frames into an outgoing video signal;
    wherein said line extender ensures durations of all lines in the outgoing video signals are of substantially equal length, and adds an extra line to the outgoing frame if the outgoing frame in the outgoing video signals has ended before a next incoming frame in the incoming video signals has started.

11. The video scaling apparatus of claim 10, wherein a number of incoming lines in the incoming frame is different than a number of outgoing lines in the outgoing frame.

12. The video scaling apparatus of claim 10, further comprising a clock generator for providing an outgoing clock signal having a frequency such that within a frame duration of the incoming frame, the outgoing frame has at least time for a correct number of lines and each line has a correct number of pixels as dictated by the outgoing resolution.

13. The video scaling apparatus of claim 12, wherein the clock generator generates the clock signal such that during the duration of the outgoing frame, there is time for the correct number of lines in the outgoing frame as dictated by the outgoing resolution in addition to time for a fraction of an extra line.

14. The video scaling apparatus of claim 10, wherein the line extender generates a next outgoing synchronization signal for the extra line such that the extra line of the outgoing frame is substantially the same duration as all other lines in the outgoing video signals.

15. The video scaling apparatus of claim 10, wherein the line extender starts a next outgoing frame after a last line of a current outgoing frame is completed if a next incoming frame starts in the middle of the last line of the current outgoing frame;

wherein the line extender determines that the last line of the current outgoing frame is completed after generating an outgoing synchronization signal for the last line of the outgoing frame such that the last line of the outgoing frame is substantially the same duration as all other lines in the outgoing video signals.

16. The video scaling apparatus of claim 15, wherein the line extender delays pixel data of the incoming video signals while completing the last line of the outgoing frame.

17. The video sealing apparatus of claim 10, wherein the sealer comprises a horizontal counter and a vertical counter, said line extender couples with said horizontal counter and said horizontal counter couples with said vertical counter through a control signal, so that said line extender ensures said horizontal counter counts to a first predetermined value for each line and said vertical counter counts to the alternative of a second predetermined value and said second predetermined value plus one for each outgoing frame.

18. The video scaling apparatus of claim 17, wherein said first predetermined value and said second predetermined value associate with an output resolution of the outgoing frame.

19. The video scaling apparatus of claim 17, wherein said vertical counter is reset to 0 in response to said control signal from said horizontal counter and a frame-based signal.

20. The video scaling apparatus of claim 19, wherein said frame-based signal is an input vertical synchronization signal.

21. The video scaling apparatus of claim 10, wherein the incoming video signals are Digital Visual Interface (DVI) or Digital Flat Panel (DFP) compliant signals.

* * * * *